United States Patent [19]

Popeil

[11] 3,931,414
[45] Jan. 6, 1976

[54] FISH BAIT COMPOSITION
[75] Inventor: Samuel J. Popeil, Chicago, Ill.
[73] Assignee: Popeil Bros., Inc., Chicago, Ill.
[22] Filed: July 12, 1974
[21] Appl. No.: 488,218

[52] U.S. Cl.................................. 426/1; 426/643
[51] Int. Cl.².................. A01K 85/00; A23L 1/325
[58] Field of Search ............... 426/1, 295, 212, 643

[56] References Cited
FOREIGN PATENTS OR APPLICATIONS
251,218  4/1963  Australia................................. 426/1

Primary Examiner—James R. Hoffman
Attorney, Agent, or Firm—Dominik, Knechtel, Godula & Demeur

[57] ABSTRACT

A cohesive mass is prepared from substantially dry fish food mixture, containing at least fish meal, pulverized freeze dried fish eggs, and water. The resulting fish bait composition is further modified by adding a water activated natural plant binder such as a vegetable gum, a starch, a dextrin or other like material. The pulverized fish eggs are water activated to contribute natural animal binding materials. The resulting mass has sufficient cohesiveness to be retained on the hook during casting or throwing movement of the hook and during water entry of the baited hook. The fish bait composition thereafter undergoes controlled dispersion in the water to attract the fish.

23 Claims, No Drawings

FISH BAIT COMPOSITION

BACKGROUND OF THE INVENTION

The art and sport of fishing has attracted countless practitioners over the centuries and a common goal of all such practitioners has been and is now the improvement of ways to catch fish. There are, of course, many other goals recognized in this art, many of which have different values to different practitioners. These include the sporting game, the natural conditions of fishing, and many others. A virtually unanimous goal is, however, improving the catch or the chances for the catch. The majoirty of efforts expended to reach this goal have concerned themselves with a bait used for fishing, food and non-food types.

THE FIELD OF THE PRESENT INVENTION

This invention relates to an improved fish bait composition; and particularly relates to a fish bait composition which utilizes known fish food mixtures in an improved way. The invention particularly relates to a fish bait composition which releases fish food particles in a somewhat controlled zone of attraction which is sufficiently definite so that it can be perceived by fish in the area.

REPRESENTATIVE STATE OF THE ART

Applicant recognizes that numerous teachings have been advanced which relate in some way to artificial fish lures, but the present invention is not concerned with this field. The present invention utilizes known fish food mixtures which have been demonstrated to have attraction to fish, and an improved form of fish eggs. In particular, the fish food mixture used in the present invention includes, at least, a fish material such as fish meal. This has been demonstrated as a successful bait for fish. Fish eggs have also been recognized as a successful bait and reference may be made to representative teachings such as U.S. Pat. No. 2,961,310 relating to fish eggs as a bait. Fish food has been used as a unitary mass that is torn apart by feeding fish, as shown in U.S. Pat. No. 3,361,114. Other representative teachings in the art relating to fish bait compositions include U.S. Pat. No. 3,528,816 and U.S. Pat. No. 3,361,566. Such art has concerned itself with the food composition, particularly as to its configuration, storage, and ingredients, but no teaching has been found in the art which refers to applicant's contribution of providing a fish bait composition which creates a controlled zone of attraction around a fish bait fixed to a hook.

OBJECTS AND ADVANTAGES OF THE INVENTION

An object of the present invention is to provide an improved fish bait composition utilizing known dry fish food mixtures recognized as a useful bait, and an improved form of fish eggs, such compositiion assuming and holding a cohesive mass, following moistening the fish food mixture and fish eggs.

Another object of the present invention is to provide an improved fish bait composition of the type described in which known fish food mixtures and pulverized freeze dried fish eggs are combined with natural plant and animal binding materials which do not detract from the quality of feeding attraction; but yet allows food mixture particles to be dispersed in a zone surrounding the composition to increase the area of attraction for fish.

Yet another object of the present invention is an improved fish bait composition of the type described in which known pulverulent fish food mixtures are formed into a cohesive mass readily and quickly so that such cohesive mass may be conveniently fixed to a fish hook.

Yet still another object of the present invention is an improved fish bait composition of the type described in which somewhat coarse fish food is advantageously combined with finer pulverized freeze dried fish eggs to that such fish food serves as a carrier for the fish-attracting eggs.

Yet another object of the present invention is to provide an improved fish bait composition of the type described in which known fish food mixtures are cohesively bound with freeze dried pulverized fish eggs and with natural binders following moistening, such binders being economical to obtain and to process for the intended purpose of the invention; and which natural binders are not rejected by the fish.

Another object of the present invention is to provide an improved fish bait dry component containing dry fish food, freeze dried fish eggs and an added plant binder which are used to advantage following extended storage by simply adding water and forming the moistened composition into a cohesive mass.

SUMMARY OF THE INVENTION

A known dry fish food mixture is combined with finely pulverized freeze dried or lyophilized fish eggs and water to obtain a cohesive mass having desired properties for molding, fixing to a hook and holding onto the hook. In a preferred form, a natural plant binder is distributed through the pulverulent food mixture so there is substantial contact between the food particles, the fish eggs and the plant binder. The binder present along the surface of the cohesive mass is dispersed when such mass is placed in water and the food particles associated with the dispersed binders are released into an area surrounding said cohesive mass. The freeze dried fish eggs are believed to contain natural animal binders since the resulting cohesive mass is held together following wetting the mixture of fish food and freeze dried eggs. In the absence of an added natural plant binder, it has been found necessary to increase the proportion of freeze dried eggs in the fish bait composition, up to about 50% by volume of the composition. It has been found that the amount of freeze dried fish eggs can be substantially reduced, say to about 10% by volume of the dry mixture when a natural plant binder is added. Such natural plant binder may be present in amounts of at least about 10% by volume of the dry mixture.

The known pulverulent fish food mixture is of the type which at least contains a fish material, preferably fish meal. A pulverulent fish food mixture consisting essentially of fish meal may also be used by the practitioner. A variety of natural plant binders may be used, along or in mixture, such as water activated starches, dextrin and vegetable gums, all of which are either dissolved or swell in the presence of water.

The vegetable gums are known thick, mucilaginous excretions from various plants, and the water soluble forms are of the arabin type such as gum arabic or India gum. Also useful are the cerasin types, such as cherry gum or sonora gum, the cerasin type swelling upon contact with water.

The freeze dried fish eggs can be a variety of fish eggs such as salmon, trout, or still others. Fresh fish eggs are freeze dried by the conventional lyophilization method which has additionally come to be known in the art under commercial preparations identified as cryochem, desivac and lyovac. Among other advantages, freeze drying is believed to retain aromatic and other savory constituents in the natural food, which is utilized to advantage in the fish bait composition of the present invention, following moistening. The freeze dried fish eggs also provide good storage properties when present with the dry fish mixture in the dry component.

It is an additional feature of the present invention that the dry, somewhat coarsely ground fish food mixture can be readily colored with vegetable or other acceptable dyes and colors to obtain attractive coloration to enhance the value of the fish bait composition.

DETAILED DESCRIPTION OF THE INVENTION

A wide variety of known fish food mixtures may be used in the present invention, and the mode presently contemplated to operate best in the invention includes the variety of commercial fish food mixtures used to raise fish or to feed fish in pools or fish farms. Such commercial fish food mixtures are generally provided in pelletized form but are readily broken down into a pulverulent form or powder form of various fineness. Generally, all such commercial fish food mixtures contain as an essential ingredient dry fish meal. Such commercially available fish food mixtures are also characterized by having a crude protein content of not less than 30% with minor amounts of crude fat and fiber, generally less than 10%. The ash content is generally between about 10–20%. All the foregoing percentages are by weight.

Such commercially available fish food mixtures also commonly include various meat meals, vegetable meals, as well as vegetable materials such as wheat middlings. Such available fish food mixtures in pulverulent form, operate within the scope of the present invention; but it should be understood that other pulverulent, substantially dry fish food mixtures may be utilized. It is only required that such fish food mixture include fish meal as an ingredient, or even substantially comprise such fish meal. In preferred form, the fish food mixture will include as a major amount the ingredients of fish meals, meat meals and vegetables, such as soybean meal and wheat germ meal. Various minerals and vitamins may be added in commercial food mixtures for fish husbandry, but such are not essential in a fish bait composition for game fish.

The art of preparing fish meals, meat meals and vegetable meals is well developed. Such meals are generally provided as dewatered and defatted materials wherein dehydration and fat removal may be attained by azetropic distillation of the fresh fish, meat or vegetable material. The preparation of such food meals by azeotropic distillation is taught, for example, in U.S. Pat. No. 3,468,674.

Among operable commercial fish food mixtures now available is STRIKE FISH FOOD supplied by Country Foods.

Without added plant binders, it is preferred that the dry composition contain about equal volumes by weight of the dry fish food mixture and the pulverized freeze dried eggs. Generally, about equal parts of fish food mixture and freeze dried eggs may be used, although some variation still leads to operable compositions. The pulverized dried fish eggs should be present in an amount sufficient so that addition of water leads to a moldable cohesive mass which retains its molded form on the fish hook. When the dry mixture consists essentially of the dry fish food mixture and the pulverized freeze dried eggs, the final composition is obtained by mixing a sufficient amount of water to form the moldable mass. Generally, the major amount of the composition comprises the dry component and the minor portion, the water component. As an example, about four parts of the dry component may be mixed with about three parts of the water component to obtain a successful cohesive mass.

The preferred practice presently contemplated provides including an additional natural plant binder in a minor amount to the dry component. It has been found that such binder can be added in amount of about 10% by volume of the dry fish food mixture, whereupon the pulverized freeze dried component need be present only at about 10% by volume of the dry fish food mixture. It has also been found that lesser volumes of water need be added as the wet component, say, about two parts of dry component to about one part water component. As an example, a successful composition will contain about 60% of dry fish food mixture, about 5% pulverized freeze dried fish eggs, about 5% natural plant binder, and about 30% of water. All such percentages being by volume. A useful range will include about 50% by volume of the dry component and about 30–50% by volume of the water component. Of the dry component, about 50–85% by volume shall comprise the dry fish food mixture and about 15–50% by volume shall comprise either pulverized freeze dried fish eggs, or combinations of the plant binder and pulverized freeze dried fish eggs.

The following Examples are presented to illustrate various embodiments of the invention, but it should be understood that none of such examples are intended to represent exclusive embodiments for practicing the invention.

EXAMPLE I

A pelletized fish food product obtained from Ralston Purina Co. under the trade designation PURINA TROUT CHOW is crushed to obtain a pulverulent form containing granules or particles of the fish food mixture of varying but small sizes. The analysis and ingredients of this product are as follows:

ANALYSIS

| | |
|---|---|
| Crude protein not less than | 40.0% |
| Crude fat not less than | 2.5% |
| Crude fiber not more than | 5.5% |
| Ash not more than | 13.0% |
| Added minerals not more than | 3.0% |

INGREDIENTS

Fish meal, soybean meal, ground wheat, corn gluten meal, Brewer's dried yeast, ground yellow corn, wheat middlings, dried blood meal, dried whey, dicalcium phosphate, iodized salt, vitamin A supplement, D activated animal sterol, menadione dimethylpyrimidinol bisulfite (source of vitamin K activity), vitamin E supplement, vitamin $B_{12}$ supplement, absorbic acid, biotin, choline chloride, folic acid, pyridoxine hydrochloride, thiamine, niacin, calcium pantothenate, riboflavin supplement, copper oxide, manganous oxide, iron oxide, zinc oxide, calcium carbonate, cobalt carbonate.

Six parts by volume of the above dry fish food mixture, somewhat coarse in form, is combined with four parts by volume of freeze dried and pulverized chinook fish eggs. The pulverized fish eggs are in fine particulate form, substantially finer than the particulate character of the dry fish food mixture. These dry products are thoroughly mixed so that the resulting dry component represents thorough distribution of the dry, somewhat coarse fish food, and the pulverized fine freeze dried fish eggs. Such a dry component represents a freeze dried fish egg proportion of 40% by volume. Four parts by volume of this dry component is throughly moistened with two and one-half parts by volume of water, and the moist mixture is then molded into a somewhat spherical cohesive mass. This formed cohesive mass is then mounted to a fish hook to substantially surround such fish hook from the hook point to about the eyelet to which the line is secured.

The cohesive mass is retained on the fish hook while such hook and line is thrown through the air and into the body of water. The cohesive mass gradually disintegrates and disperses in the water to create a progressively increasing zone of fish bait to attract the fish, in the nature of chumming action.

EXAMPLE II

A pulverulent fish food mixture is obtained by combining a major amount of fish meal and meat meal with a minor amount of soybean meal, cottonseed meal, wheat germ meal, Brewers' dried grains, Brewers' dried yeast, dried whey, and blood meal. A sample of this pulverulent fish food mixture is combined with an equal volume of freeze dried and pulverized Coho fish eggs to obtain a dry component. Four parts by volume of this dry component is added to three parts by volume of water, and such components are intimately mixed to obtain a cohesive mass, suitable as a fish bait for mounting to a fish hook.

EXAMPLE III

A dry fish bait component is prepared from combining the following ingredients in the proportions identified.

| Ingredient | Parts by Volume |
| --- | --- |
| Dry Fish Food Mixture | 5¼ |
| Pulverized Freeze Dried Trout Eggs | ½ |
| Plant Binder | ½ |

The pulverulent dry fish food mixture is that described in Example I. The plant binder is a commercial preparation available under the trade designation W-C Stabilizer supplied by Holton Food Products of Chicago, Ill., and containing vegetable gums, starch, potassium bitartrate, sugar and dextrose. The above dry component comprises a total of six and one-quarter parts with the freeze dried fish eggs and the plant binder each comprising slightly less than 10% by volume of the dry component.

To the 6¼ parts by volume of the dry component is added three parts by volume of water with thorough mixing until the entire mass is moistened and is moldable into a cohesive mass. The total composition then contains the following percent of ingredients by volume.

| Ingredient | Percent by Volume |
| --- | --- |
| Dry Fish Food Mixture | 56.8 |
| Pulverized Freeze Dried Eggs | 5.4 |
| Plant Binder | 5.4 |
| Water | 32.4 |

EXAMPLE IV

The dry fish food mixture of Example I is combined in an amount of five parts by volume with three-fourth parts by volume of pulverized freeze dried Coho fish eggs and one-half part by volume of an added plant binder to thereby obtain a total dry component of 6¼ parts. The plant binder contains about equal parts of water activated vegetable gums and plant starch. The foregoing dry component in an amount of 6¼ parts by volume is mixed with 2 ½ parts by volume of water until the dry component is thoroughly moistened and the resulting composition is moldable into a cohesive mass.

EXAMPLE V

The dry components prepared in the foregoing Examples are moistened with sufficient water taken from a body of water in which the fish bait composition is to be deposited to attract fish. The cohesive mass prepared in accordance with the foregoing Examples is mounted by compressing each separate mass around a different fish hook to substantially cover said fish hook up to the eyehole. Each hook and mounted fish bait composition is then lowered by a line into a body of water. In each case, the food particles at the surface are released and dispersed as the natural binder is dissolved or dissipated into the surrounding body of water. The released food particles and fish eggs increasingly form a gustatory zone of attraction around the cohesive mass which is progressively reduced in volume until the fish bait composition became completely exhausted from its mounting on the fish hook. The irregular formed zone surrounding the fish hook becomes more dense as the fish bait particles are dispersed into the water. The zone is most dense closest to the cohesive mass and irregularly became less dense the further such zone is extended from the cohesive mass. In all instances, a discrete zone, regular or irregular, is formed around the original cohesive mass mounted on the hook to extend the zone of potential attraction to any present fish.

In one form of the invention, the cohesive mass may be formed by mixing the dry and liquid components only with the use of mixing tools and measuring volumes. The resultant composition is then molded into the cohesive mass with filling tools and a mold cavity. The hook may be positioned in the mold cavity so that the filling means may urge the cohesive mass around the fish hook. The hook with mounted cohesive mass may then be removed from the molded cavity by pulling the attached line. In such a way, finger contact with the fish bait composition is avoided which may be objectionable in that the fish may be repelled by human associated scents.

It is understood that the formation of the cohesive mass and the development of the gustatory zone of attraction through fish bait particle dispersion are important features of the invention, as well as the presence of the pulverized freeze dried fish and coarser fish food in the dry component of the composition. It is supported that the zone of dispersed fish bait particles attracts the fish to the area so that the fish is urged to strike against the source from which such zone of attraction emanates. Whatever the explanation, there is now provided an improved fish bait composition and a method for its preparation which leads to an improved method of fishing.

The dry component is preferably prepared, packaged and stored for the user who can then prepare the fish bait composition by moistening the dry component with sufficient water component to moisten the fish bait particles so the cohesive mass can be molded. The user can determine the sufficient amount of water required, or can follow the explicit teachings of the present invention. The dry component will contain about equal parts by volume when dry fish mixture and freeze dried fish eggs comprise essentially such dry component. Generally, each of these dry food ingredients can be present in ranges of about 40%–60% by volume.

A dry component including added plant binder will contain lesser amounts of the pulverized freeze dried fish eggs. The dry fish food mixture will comrpise a major proportion and the freeze dried fish eggs and added binder will, together, comprise a minor proportion of the dry component. The dry fish mixture is generally present in amounts of about 70%–90% by volume, and each of the freeze dried eggs and added binder are each present in amounts of about 5%–15% by volume of the dry component.

The claims of the invention are now presented and the terms of such claims may be further understood by reference to the language of the preceding specification.

What is claimed is:

1. A fish bait composition which includes
   a dry component comprising a pulverulent fish food including at least fish meal, said fish food having at least a 30% protein content, and said dry component further comprising pulverized freeze dried fish eggs which have a fine particle size relative to the coarser particle size of the fish food,
   said pulverized freeze dried fish eggs being distributed throughout said coarser fish food,
   water intimately mixed with said dry component in an amount sufficient to moisten all the particles present in said dry component, and
   said pulverized freeze dried fish eggs present in the dry component being in an amount sufficient to provide binding so a resultant cohesive mass of the moistened fish bait particles can be formed for mounting to a fish hook and retention on said fish hook when depositing the fish hook and mounted fish bait composition into a body of water to attract fish.

2. A fish bait composition which includes the features of claim 1 above wherein said dry component consists essentially of about equal parts by volume of the pulverized freeze dried fish eggs and the fish food.

3. A fish bait composition which includes the features of claim 2 wherein about four parts by volume of said dry component is mixed with about three parts by volume of said water to obtain said cohesive mass.

4. A fish bait composition which includes the features of claim 1 wherein said dry component further includes a water activated natural plant binder.

5. A fish bait composition which includes the features of claim 4 wherein said fish food is present in a major proportion in said dry component, and said pulverized freeze dried fish eggs and plant binder together are present in a minor proportion in said dry component.

6. A fish bait composition which includes the features of claim 5 wherein about one part by volume of said dry component is combined with about one-half part by volume of said water to obtain said cohesive mass.

7. A fish bait composition which includes the features of claim 4 wherein said plant binder is a vegetable gum activated by water to at least swell in the presence of such water.

8. A fish bait composition which includes the features of claim 4 wherein said plant binder is a starch activated by water to at least swell in the presence of such water.

9. A fish bait composition which includes the features of claim 4 wherein said plant binder is dextrin which is activated by dissolving in water.

10. A fish bait composition which includes the features of claim 1 wherein said dry component is present from about 50% to about 70% by volume in the composition, and said water is present from about 30% to about 50% by volume in said composition.

11. A fish bait composition which includes the features of claim 10 wherein said fish food in said dry component is present from about 50% to about 90% by volume, and said pulverized freeze dried fish eggs are present from about 10% to about 50% by volume in the dry component.

12. A fish bait composition which includes the features of claim 11 wherein said dry component further includes from about 5% to about 15% of a water activated plant binder, with the further provision that the pulverized freeze dried fish eggs are present in about the same parts by volume as said plant binder.

13. A fish bait composition which includes the features of claim 12 wherein said plant binder is selected from the group consisting of a water activated vegetable gum, a water activated starch, and water activated dextrin.

14. A fish bait composition which includes the features of claim 12 wherein said dry component comprises about equal parts by volume of fish food and pulverized freeze dried fish eggs, and wherein about four parts by volume of said dry component is mixed with about three parts by volume of said water.

15. A fish bait composition which includes the features of claim 12 wherein said dry component comprises about five parts by volume of dry fish food, about one-half part by volume of pulverized freeze dried fish eggs and about one-half part by volume of an plant binder, and wherein about two parts by volume of said dry component is combined with about one part by volume of the water to obtain said cohesive mass.

16. A fish bait composition which includes the features of claim 15 wherein said plant binder includes a mixture of water activated vegetable gum and plant starch.

17. A fish bait dry component adapted to be combined with water to obtain a moistened, moldable, cohesive mass for mounting to a fish hook, said dry component including fish food of coarsely ground particles including at least fish meal and having a protein content of at least 30%, and
   pulverized freeze dried fish eggs distributed throughout said fish food, said fish eggs having a fine particle size relative to said fish food.

18. A fish bait dry component which includes the features of claim 17 wherein said dry component further includes a minor amount of a water activated plant binder selected from the group consisting of vegetable gum, plant starch, and dextrin.

19. A fish bait dry component which includes the features of claim 18 wherein said fish food comprises a major proportion, and said freeze dried fish eggs and plant binder are present in about equal proportions by weight, and comprise a minor proportion of said dry component.

20. A fish bait dry component which includes the features of claim 18 wherein said dry fish food is present from about 70% to about 90% by volume and each of the freeze dried eggs and plant binder is present from about 5% to about 15% by volume in said dry component.

21. A fish bait dry component which includes the features of claim 20 wherein said dry fish food is present in about 80% by volume and each of said freeze dried fish eggs and plant binder is present at about 10% by volume in said dry component.

22. A fish bait dry component which includes the features of claim 21 wherein said plant binder is a mixture of water activated vegetable gum and plant starch.

23. A fish bait dry component which includes the features of claim 17 wherein said dry fish food and said pulverized freeze dried fish eggs are present in about equal proportions by volume in said dry component.

* * * * *